United States Patent [19]

Marshall

[11] 4,351,796
[45] Sep. 28, 1982

[54] METHOD FOR SCALE CONTROL
[75] Inventor: Alan Marshall, Macclesfield, England
[73] Assignee: Ciba-Geigy Corporation, Ardsley, N.Y.
[21] Appl. No.: 213,144
[22] Filed: Dec. 4, 1980

Related U.S. Application Data

[63] Continuation-in-part of Ser. No. 124,058, Feb. 25, 1980, abandoned, which is a continuation of Ser. No. 21,650, Mar. 19, 1979, abandoned, which is a continuation of Ser. No. 849,743, Nov. 9, 1977, abandoned.

[51] Int. Cl.³ .................. C23F 11/16; C23F 11/18
[52] U.S. Cl. ..................... 422/15; 106/14.12; 106/14.13; 252/181; 252/389 A; 422/17; 422/18
[58] Field of Search .......... 106/14.12, 14.13; 252/181; 422/15, 17, 18

[56] References Cited

U.S. PATENT DOCUMENTS

| | | | |
|---|---|---|---|
| 3,810,834 | 5/1974 | Jones et al. | 210/58 |
| 3,837,803 | 9/1974 | Carter et al. | 21/2.7 |
| 3,923,876 | 12/1975 | Heins et al. | 260/502.4 R |
| 3,935,125 | 1/1976 | Jacob | 252/389 A |
| 3,959,168 | 5/1976 | Germscheid et al. | 252/180 |
| 3,963,636 | 6/1976 | Harris et al. | 252/181 |
| 3,992,318 | 11/1976 | Gaupp et al. | 252/389 A |
| 4,042,324 | 8/1977 | Auel et al. | 21/2.7 A |
| 4,052,160 | 10/1977 | Cook et al. | 21/2.7 A |
| 4,057,511 | 11/1977 | Bohnsack et al. | 252/389 A |
| 4,105,581 | 8/1978 | Sexsmith | 252/389 A |

FOREIGN PATENT DOCUMENTS

| | | |
|---|---|---|
| 2225645 | 1/1974 | Fed. Rep. of Germany . |
| 2337100 | 2/1974 | Fed. Rep. of Germany . |
| 2632714 | 7/1976 | Fed. Rep. of Germany . |
| 2213236 | 8/1974 | France . |

OTHER PUBLICATIONS

Chem. Abstract vol. 80 (1974) 123690j.
Chem. Abstract vol. 81 (1974) 54260a.

*Primary Examiner*—Lorenzo B. Hayes
*Attorney, Agent, or Firm*—Luther A. R. Hall

[57] ABSTRACT

A method of inhibiting the deposition of calcium phosphate scale from an aqueous system treated with a corrosion inhibitor formulation containing a phosphonocarboxylic acid and a polyphosphate comprises adding to the aqueous system a minor amount of hydrolyzed polymaleic anhydride having a molecular weight in the range of from 300 to 5000 as determined by calculation following osmometric measurement on the polymaleic anhydride before hydrolysis, or a water-soluble salt or a hydrolyzed copolymer of polymaleic anhydride.

4 Claims, 1 Drawing Figure

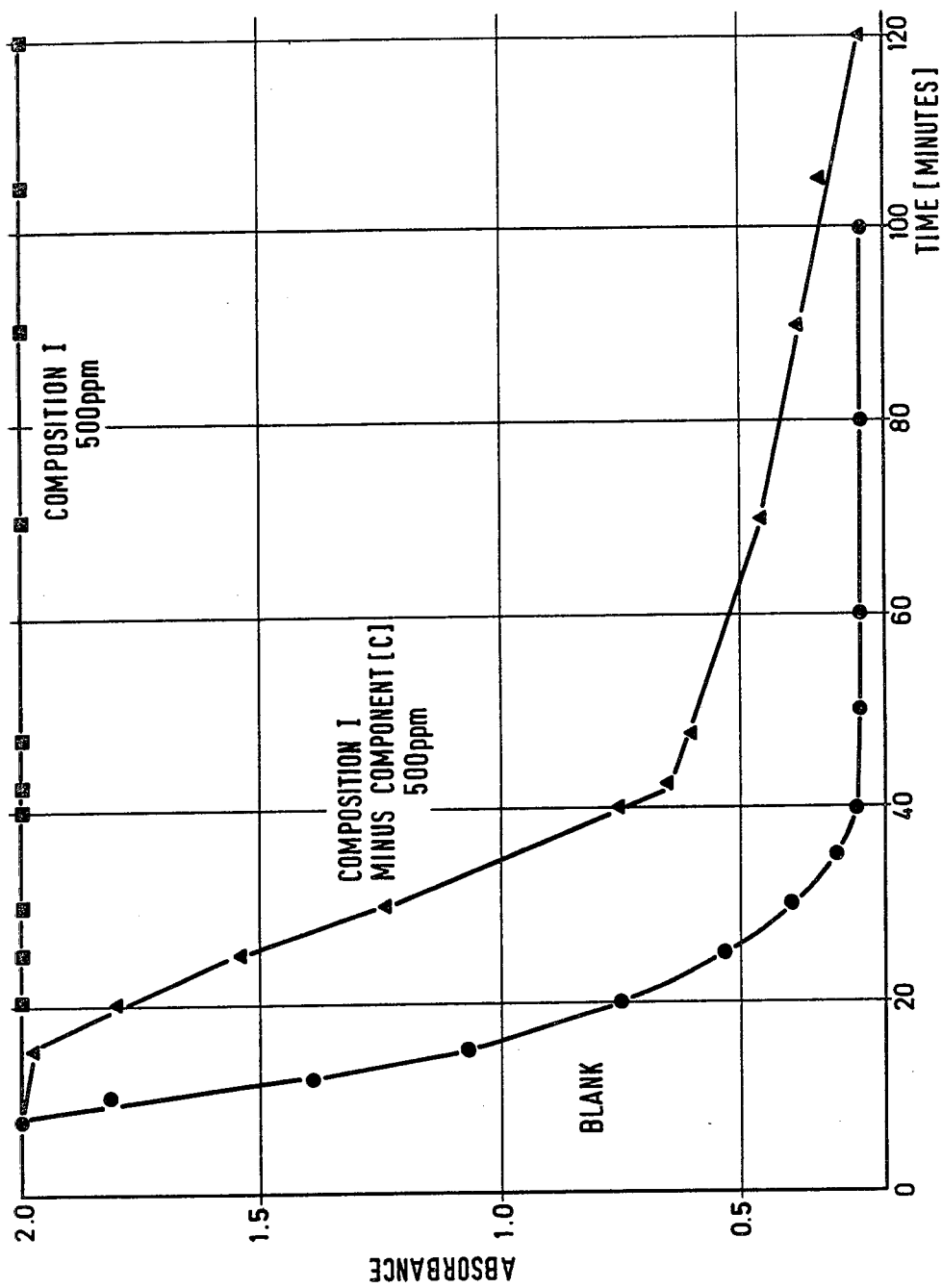

METHOD FOR SCALE CONTROL

This is a Continuation-in-Part of Application Ser. No. 124,058, filed Feb. 25, 1980, now abandoned; which in turn is a Continuation of Application Ser. No. 21,650, filed Mar. 19, 1979, now abandoned; which in turn is a Continuation of Application Ser. No. 849,743, filed Nov. 9, 1977, now abandoned.

BACKGROUND OF THE INVENTION

The present invention relates to corrosion inhibitors and/or scale control agents for aqueous systems.

Traditionally chromates, dichromates, nitrites, benzoates, silicates, polyphosphates etc. have been used to combat corrosion. However each of these inhibitors suffers from at least one serious disadvantage. Chromates and dichromates are toxic and disposal of them to water courses presents severe ecological problems. Inorganic nitrates require high dose levels to function effectively and they are also subject to bacterial decomposition. This necessitates the use of an expensive organic biocide since chlorine cannot be used as it reacts with nitrite. Benzoates and silicates also require high dose levels and silicates, furthermore, tend to coat metal surfaces with a hydrated silica gel which is often very difficult to remove.

Polyphosphates are effective at relatively low dosage rates but suffer from hydrolysis to phosphate especially at high temperature and at pHs below 7. The phosphate ions liberated on hydrolysis are not effective as corrosion inhibitors, give rise to sludge problems due to the precipitation of calcium orthophosphate and serve as nutrient for biological growth unless chlorine or another biocide is used.

In an attempt to overcome the problems associated with polyphosphate hydrolysis, corrosion inhibitor systems based on the more hydrolytically stable organic phosphorus components have been developed. Examples of this type of phosphorus compound are phosphonocarboxylic acids, e.g. those described in German Patent Specification No. 2,225,645.

Formulations incorporating phosphonic acid or phosphono-carboxylic acid and polyphosphate are well-known for the control of corrosion and scale formation in aqueous cooling systems. Such formulations normally incorporate a non-ferrous corrosion inhibitor e.g. azoles such as benzotriazole or methylene bis-benzotriazole or other azoles known in this art as corrosion passivators or inhibitors.

These known formulations have the disadvantage however that the polyphosphate may hydrolyse to form an orthophosphate which can then precipitate calcium ions present in the cooling water to form calcium phosphate scale or sludge. Such sludges are undesirable and can cause severe problems such as fouling of heat exchangers, blocking of filters and strainers, inefficient operation of cooling tower, reduced effectivity of the corrosion inhibitor formulation and increased pumping costs or reduced flow rates through the system.

This problem is currently alleviated by reducing the pH of the system (usually by addition of acid) to 7.0–7.5 where the calcium phosphate is more soluble. However, this practice increases the corrosion of ferrous metals and does not necessarily stop all scale/sludge formation.

Such corrosion inhibitor formulations are described in German Offen. No. 2,225,645; U.S. Pat. No. 3,837,803; and German Offen. No. 2,337,100.

The phosphono-carboxylic acids are known as seen in German Offen. No. 2,632,774; U.S. Pat. Nos. 3,923,876; 3,959,168; 4,042,324; 4,052,160 and 4,057,511.

The phosphonic acids are described in U.S. Pat. Nos. 3,935,125; 3,992,318 and 4,105,581.

The polyphosphates are described in U.S. Pat. Nos. 3,992,318 and 4,105,581; and in French Pat. No. 2,213,236.

It has now been found that, by introducing hydrolysed polymaleic anhydride into a corrosion inhibitor formulation containing polyphosphate, and a phosphono-carboxylic acid, the problems of calcium phosphate scale/sludge are eliminated and that the addition of acid is no longer required. In fact the addition of hydrolysed polymaleic anhydride to a formulation used in a system treated with acid can still provide better control of sludge/scale formation than the use of acid alone.

Hydrolyzed polymaleic anhydride is described in U.S. Pat. No. 3,963,636. The relevant portions of said U.S. patent are hereby incorporated by reference for the purpose of defining hydrolyzed polymaleic anhydride or a water soluble salt of such a hydrolyzed polymaleic anhydride.

DETAILED DESCRIPTION OF THE INVENTION

Accordingly, the present invention provides a method of inhibiting the deposition of calcium phosphate scale or sludge from an aqueous system treated with a corrosion inhibitor formulation containing a phosphono-carboxylic acid and a polyphosphate which comprises adding to the aqueous system a minor amount of hydrolyzed polymaleic anhydride having a molecular weight in the range of from 300 to 5000 as determined by calculation following osmometric measurement on the polymaleic anhydride before hydrolysis, or a water soluble salt of such a hydrolyzed polymaleic anhydride or a hydrolyzed copolymer of polymaleic anhydride.

The instant method is particularly effective when the phosphono-carboxylic acid is selected from the following:

(a) a compound of the formula:

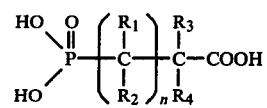

I wherein n is 0 or 1 and, when n is 0, $R_3$ and $R_4$ are the same or different and each is hydrogen, an alkyl group having from 1 to 4 carbon atoms, a benzyl, allyl, a —$CH_2PO_3H_2$— group, a —$CH(COOH)CH_2COOH$ group or a group of formula

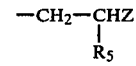

wherein $R_5$ is hydrogen, a methyl, —$CH_2COOH$ or —$CH_2CH_2COOH$ group, and Z is a group —COOH or —$PO_3H_2$; and, when n is 1, $R_1$ and $R_2$ are the same or different and each is hydrogen or a methyl or phenyl residue, $R_3$ is hydrogen and $R_4$ is hydrogen, an alkyl group having from 1 to 4 carbon atoms or a —$CH_2CH$-

$_2$COOH group, or R$_3$ and R$_4$ together may form a methylene group=CH$_2$: and/or (b) a compound having the formula:

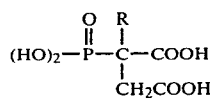

wherein R is hydrogen, an alkyl, an alkenyl or alkynyl group, each having up to 4 carbon atoms, a phenyl group, cycloalkyl group having from 3 to 6 carbon atoms, a benzyl group, a phenethyl group or a residue having the formula:

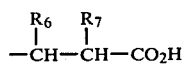

wherein R$_6$ is hydrogen, an alkyl group having from 1 to 4 carbon atoms or a carboxyl group and R$_7$ is hydrogen or methyl group; and/or (c) a compound having the formula:

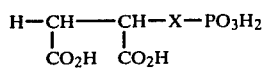   III wherein X is

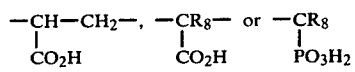

wherein R$_8$ is hydrogen or a methyl group.

Preferred compounds of formula I are those wherein:
(i) n is 0 and R$_3$ is hydrogen or
(ii) n is 1, R$_1$ and R$_3$ are hydrogen and either R$_2$ is hydrogen and R$_4$ is hydrogen, and alkyl group having from 1 to 4 carbon atoms or —CH$_2$CH$_2$COOH or R$_2$ is methyl and R$_4$ is hydrogen.

Particularly, preferred compounds of formula I are those wherein n is 0 and R$_3$ and R$_4$ are each hydrogen, or n is 1 and R$_1$, R$_2$ and R$_3$ are each hydrogen and R$_4$ is a methyl group.

Preferred compounds of formula II are those wherein R has the formula:

Specific examples of compounds of formulae I, II and III include:
(1) 2-phosphonoacetic acid
(2) 2-phosphonopropionic acid
(3) 2-phosphonohexanoic acid
(4) 3-phenyl-2-phosphonopropionic acid
(5) 2-phosphono pent-4-enoic acid
(6) 2-methyl-3-phosphonopropionic acid
(7) 2-butyl-2-phosphonohexanoic acid
(8) 2-methyl-2-phosphonohexanoic acid
(9) 2-methyl-3-phenyl-3-phosphonopropionic acid
(10) 2,3-diphosphonopropionic acid
(11) 1-phosphonopropane-1,2,3-tricarboxylic acid
(12) 1-phosphonopropane-1,3-dicarboxylic acid
(13) 3-methyl-1-phosphonopropane-1,3-dicarboxylic acid
(14) 1-phosphonobutane-1,3,4-tricarboxylic acid
(15) 1-phosphonopentane-1,3,5-tricarboxylic acid
(16) 2,4-diphosphonobutyric acid
(17) 4-methyl-2,4-diphosphonobutyric acid
(18) 3-phosphonopentane-1,3,5-tricarboxylic acid
(19) 5-phosphonononane-1,3,5,7,9-pentacarboxylic acid
(20) 3-phosphonoheptane-1,3-dicarboxylic acid
(21) 1-phenyl-2-phosphonobutane-2,4-dicarboxylic acid
(22) 3-phosphonopropionic acid
(23) 3-phosphonobutanoic acid
(24) 3-methyl-3-phosphonobutanoic acid
(25) 3-phenyl-3-phosphonopropionic acid
(26) 2-methyl-3-phosphonopropionic acid
(27) 2-butyl-3-phosphonopropionic acid
(28) 1-phosphonobutane-2,4-dicarboxylic acid
(29) 2-phosphonomethylacrylic acid
(30) 2-phosphonobutane-1,2,4-tricarboxylic acid.

The compounds of formulae I, II and III are known compounds and may be prepared by methods well known per se. Such known methods for the production of Compounds I are described in more detail in German Offenlegungsschrift No. 2,632,774.

The instant method is especially effective when the phosphono-carboxylic acid is selected from the group consisting of the acids of formula II, of formula III and mixtures thereof.

As is seen in Example 3, the phosphono-carboxylic acids which are especially effective in the instant process include 1-phosphonoethane-1,2-dicarboxylic acid, 2-phosphonobutane-1,2,4-tricarboxylic acid, 2-phosphonobutane-1,2,3,4-tetracarboxylic acid and 1-phosphonopropane-1,2,3-tricarboxylic acid.

The most preferred embodiment of the phosphono-carboxylic acid is 2-phosphonobutane-1,2,4-tricarboxylic acid.

The water-soluble polyphosphate, may be an alkali metal polyphosphate such as sodium polyphosphate, a potassium polyphosphate, a lithium polyphosphate or ammonium polyphosphate. Specific examples of preferred polyphosphates are: tetrasodium pyrophosphate, sodium tripolyphosphate or a polymeric sodium metaphosphate of formula:

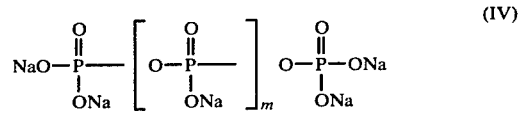   (IV)

wherein m is an integer from 4 to 20.

By the material "hydrolysed polymaleic anhydride" we mean that material prepared from polymer obtained by the addition polymerisation of a monomer feed comprising substantially maleic anhydride under bulk or solution polymerisation conditions. The main chain of the initial polymer is substantially formed of non-hydrolysable linkages. The initial unhydrolysed polymer product, when free of unreacted monomer and other non-polymeric molecular species, is subsequently hydrolysed by water or a water-soluble alkali, either before use or by the act of incorporation into the water to be treated.

Decarboxylation of the polymer may occur during polymerisation or subsequent hydrolysis, so that the acid value of the hydrolysed polymaleic anhydride is found to be lower than the theoretical value of 956 mg KOH per gram, but such decarboxylation does not proceed to such an extent that the acid value falls to below 350 mg KOH/gram. The acid value is determined by potentiometric titration in aqueous solution against 0.1 potassium hydroxide solution, the end point being taken as the highest peak on the plot of ΔpH: ΔV against V where ΔpH is the change of pH, ΔV is the change in volume and V is the volume of titre.

It is important that the hydrolysed polymaleic anhydride should be of the stated low molecular weight range. As the molecular weight of the hydrolysed polymaleic anhydride is increased, so the hardness of what scale is produced increases. We prefer to use material of molecular weight not exceeding 2000 and preferably having a molecular weight of from 500 to 1000 and have found that material having a molecular weight of about 750 is very suitable; for all intents and purposes a molecular weight of 5000 gives scales which are at the limit of acceptability.

The molecular weight of the hydrolysed polymaleic anhydride is not readily available by direct measurement but is easily derived from that of the polymaleic anhydride before hydrolysis. For example, if the mean molecular weight of a polymaleic anhydride is 800, which can be measured by osmosis using dioxane as solvent, and each molecule contains on average seven units of anhydride, the theoretical molecular weight of the hydrolysed polymaleic anhydride prepared from it will be $800 + (7 \times 18)$, that is 926.

Although a hydrolyzed copolymer of polymaleic anhydride can be used in the instant invention, the preferred embodiment is the hydrolyzed polymaleic anhydride or a water-soluble salt of such hydrolyzed polymaleic anhydride as described in U.S. Pat. No. 3,963,636.

Normally, the total amount of phosphono-carboxylic acid, polyphosphate and hydrolyzed polymaleic anhydride or a water-soluble salt thereof used in the instant aqueous system will lie between 1 and 100 ppm, calculated on the water or aqueous system. Very satisfactory results are obtained using from 5 to 70 parts per million, and preferably from 10 to 40 parts per million.

The amount of hydrolyzed polymaleic anhydride or a water-soluble salt thereof used in the instant method is preferably from 0.5 to 10% by weight based on the total weight of hydrolyzed polymaleic anhydride or a water soluble salt thereof, polyphosphate and phosphono-carboxylic acid used in treating the aqueous system.

The amount of polyphosphate is preferably from 30 to 50% by weight of said total and the amount of phosphono-carboxylic acid is preferably from 40 to 69.5% by weight of said total.

Other corrosion inhibitors may be used in conjunction with mixture of additives described above. These include the soluble zinc salts, nitrites e.g. sodium nitrite, chromates, e.g. sodium chromate, nitrates, e.g. sodium nitrate, water-soluble azoles which would be incorporated in the formulation at 0.1–5%, e.g. triazoles such as benzotriazole, bis-benzotriazole and other copper-passivating benzotriazole derivatives, pyrazole, imidazole, isoxazole and thiazoles such as isothiazole, as well as N-acyl sarcosines, triethanolamines, fatty amines and polycarboxylic acids, e.g. polyacrylic acid.

Dispersing and/or threshold agents may be used, such as for example polymerised acrylic acid and its salts, hydrolysed polyacrylonitrile, polymerised methacrylic acid and its salts, polyacrylamide and copolymer thereof from acrylic and methacrylic acids, lignin sulphonic acid and its salts, tannin, naphthalene sulphonic acid/formaldehyde condensation products, starch and its derivatives, and cellulose. Specific threshold agents such as, for example, alkyl phosphonic acids, 1-aminoalkyl-1,1-diphosphonic acids and their salts and alkali metal phosphates, may also be used.

Precipitating agents such as alkali metal orthophosphates, carbonates, oxygen scavengers such as alkali metal sulphites and hydrazine, sequestering agents such as nitrilotriacetic acid and their salts, ethylene diamine tetraacetic acid and its salts, antifoaming agents such as distearylsebacamide, distearyl adipamide and related products derived from ethylene oxide condensations, in addition to fatty alcohols such as capryl alcohols and their ethylene oxide condensates, may also be used.

The following Examples further illustrate the present invention. Parts and percentages shown therein are by weight unless otherwise stated.

EXAMPLES 1 AND 2

Evaluation of Corrosion Inhibition by a Laboratory Heat Exchanger Rig Test

The following additive mixture (Composition I) was made up:
- 7% 2-phosphonobutane-1; 2;4-tricarboxylic acid
- 36% a commercially-available liquid polyphosphate (20% available $P_2O_5$)
- 2% a commercially-available hydrolysed polymaleic anhydride (as described in British patent specification No. 1,369,429)
- 0.5% benzotriazole
- 7.5% sodium hydroxide In this rig, corrosive water is aerated and circulated over a number of metal coupons, and is heated by being passed through a heated steel heat exchanger tube. After a suitable test period, the metal coupons and the heat exchanger tube are examined, and their state assessed.

In detail, the rig consists of a closed water circuit, made up of the following items in order,
- 20 liter reservoir
- 1 liter reservoir
- flow meter
- coupon chamber
- heat exchanger
- cooling condenser Corrosive water in the 20 liter reservoir is aerated with compressed air introduced through a sintered disc at about 5 liters per minute, and is then pumped to the 1 liter reservoir. From this reservoir it is pumped through the flow meter to the glass coupon chamber in which are a number of rectangular metal coupons each 2.5 by 5.0 cms. mounted on a perspex jig. The water then flows through the heat exchanger which is made up of a 1.58 cm. internal diameter steel tube with copper end pieces around which is wound a 960 watt heater coil; from the heat exchanger the water flows through the cooling condenser back to the 20 liter reservoir.

A flow rate in the circuit of about 4.55 liters per minute provides a velocity of about 0.46 meter per second and a Reynolds number of 8500 in the heat exchanger. The heater coil gives the heat exchanger tube a skin temperature of about 60° C. and the water leaves at about 45° C., a difference across the heat transfer surface of some 15° C. The cooling condenser is so operated as to cool the water to about 40° C. before it begins a fresh circuit.

Metal coupons are scrubbed with pumice and then immersed in acid as follows:

| Metal | Acid |
| --- | --- |
| mild steel | Conc. HCl diluted 1:1 with water at room temperature for 1 minute |
| copper | Conc. HCl diluted 1:1 with water at room temperature for 1 minute |
| brass | Conc. HCl diluted 1:1 with water at room temperature for 1 minute |
| Aluminium | 5% phosphoric acid/2% Chromic acid, at 75° C. for 5 minutes. |

After such immersion, the coupons are rinsed with water, dried and weighed; they are then mounted on a perspex jig, care being taken to ensure that none of the coupons touch each other, and that they are insulated from the bolt holding the jig together. The heat exchanger tube is cleaned with pumice, dipped in conc. hydrochloric acid diluted 1:1 with water, and then rinsed in water and dried.

The rig is assembled, and cleaned thoroughly by circulating conc. hydrochloric acid diluted 1:1 with water, then flushing with tap water for about half-an-hour (about 136.4 liters in all) and draining. The necessary quantity of additives to produce the desired concentrations is put into one of the reservoirs and the rig is filled with 22 liters of a standardized Manchester or London corrosive test water.

The pump is primed and started, and the heater switched on.

The concentration of inhibitor and the water level in the rig are checked daily.

After approximately ten days, the heat exchanger tube is removed, sectioned and examined. The test coupons are removed and the mild steel, brass and copper coupons are cleaned as before except that the acid is inhibited with 1% hexamine, rinsed, dried and reweighed. The aluminium specimens are scrubbed, dried and reweighed.

The results observed enable an assessment to be made of the anti-corrosive action of the inhibitor under test.

Using this test procedure, the following results were obtained:

The water analyses for the waters used are:

|  | Manchester | London |
| --- | --- | --- |
| Permanent Alkalinity | 0 | 0 |
| Temporary Alkalinity | 25 | 220 |
| Total Hardness | 30 | 280 |
| Chloride Content | 10 | 60 |

The results in the Table highlight the improvement achieved in corrosion inhibition using a composition according to the method of the present invention.

PHOSPHATE DISPERSION DETERMINATION

The initial part of the test was carried out in 100 ml. measuring cylinder in a water bath at 70° C.

The potential dispersant was added to 50 ml. $CaCl_2.2H_2O$ solution (3.67 g/l) followed by 50 ml. $Na_3PO_4.12H_2O$ solution (19.0 g/l). The mixture was shaken and replaced into the water bath for 30 minutes. After which time the mixture was removed from the water bath and allowed to cool to room temperature. The mixture was then shaken again and a representative sample taken and placed into a 4 cm. silica glass spectrometer cell. The absorbance of the mixture was measured at a wavelength of 400 nm. using a spectrometer (Unicam SP1800) at various time intervals. A decrease in absorbance indicates that the $Ca_3(PO_4)_2$ produced is settling out from the solution.

The results obtained were plotted on the accompanying FIG. 1.

EXAMPLE 3

Influence on structure of Phosphono-carboxylic acid on corrosion inhibition in presence of polyphosphate and hydrolyzed polymaleic anhydride The following additive mixture was made up:
7% compound under test
36% commercially-available liquid polyphosphate (20% available $P_2O_5$)
2% commercially-available hydrolysed polymaleic anhydride (as described in British Patent Specification No. 1,369,429)
0.5% benzotriazole
7.5% sodium hydroxide.

TABLE I

| Example | Additive | Conditions | Corrosion rate (mdd) | | | |
| --- | --- | --- | --- | --- | --- | --- |
| | | | Mild Steel | Cast Iron | Copper | Mild Steel Heat Exchanger |
| — | none | Manchester water 40° C. pH = 7.0 | 94.0 | 110.0 | 2.4 | 410.0 |
| 1 | Composition I | Manchester water 40° C. pH = 7.0 | 7.6 | 32.0 | 0.4 | 40.6 |
| — | none | London water 40° C. pH = 8.5 | 46.4 | 53.9 | 2.0 | 110.0 |
| 2 | Composition I | London water 40° C. pH = 8.5 | 17.7 | 12.6 | 0.8 | 16.4 |
| — | Composition I minus Component C | London water 40° C. pH = 8.5 | 29.1 | 27.8 | 0.4 | 44.8 |

Corrosion inhibitor activity of the product of Example 1 was demonstrated in the following way by the Aerated Solution Bottle Test and using a standard corrosive water made up as follows:

| | |
|---|---|
| 20 g. | CaSO$_4$.2H$_2$O |
| 15 g. | MgSO$_4$.7H$_2$O |
| 4.6 g. | NaHCO$_3$ |
| 7.7 g. CaCl$_2$.6H$_2$O | |
| 45 gallons Distilled Water | |

Mild Steel coupons, 5 cms×1.5 cms are scrubbed with pumice, immersed for one minute in hydrochloric acid and then rinsed, dried and weighed.

The desired proportion of additive combination is dissolved in 100 ml. of standard corrosive water. A steel coupon is suspended in the solution, and the whole is stored in a bottle in a thermostat at 40° C. During the storage period, air is passed into the solution at 500 ml/minute, the passage of the air being screened from the steel coupon; any water losses by evaporation are replaced, as they occur, with distilled water from a constant apparatus.

After 48 hours, the steel coupon is removed, scrubbed with pumic, immersed for one minute in hydrochloric acid inhibited with 1% by weight of hexamine, and then rinsed, dried and reweighed. A certain loss in weight will have occurred. A blank test i.e. immersion of a mild steel specimen in the test water in the absence of any potential corrosion inhibitor, is carried out with each series of tests. The corrosion rates are calculated in milligrams of weight loss/sq. decimeter/day (m.d.d.) but for convenience the results are shown as percentage protection, which is defined as follows:

$$\% \text{ Protection} = \frac{\text{Corrosion rate for blank (in } mdd) - \text{corrosion rate for sample (in } mdd)}{\text{Corrosion rate for blank (in } mdd)} \times 100$$

The following results were obtained:

| Phosphono-Carboxylic Acid | | % Protection at | | |
|---|---|---|---|---|
| | Type. | 100 ppm | 80 ppm | 60 ppm |
| I | (a) | 86 | 78 | 48 |
| II | (b) | 95 | — | — |
| | (c) | 100 | 95 | 70 |
| | (d) | 99 | — | — |
| III | (e) | 98 | — | — |

STRUCTURE I (a) 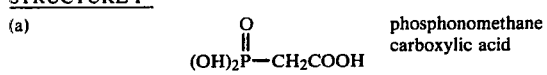 phosphonomethane carboxylic acid

STRUCTURE II (b) 
```
    O  CH2COOH
    ‖  |
(OH)2P—CH—COOH
```
1-phosphono-ethane-1,2-dicarboxylic acid (c) 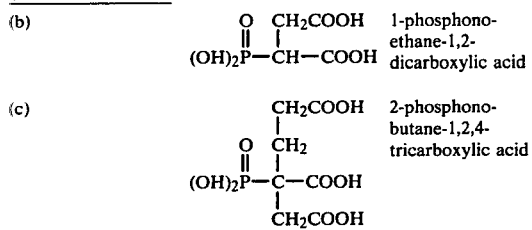 2-phosphono-butane-1,2,4-tricarboxylic acid (d) 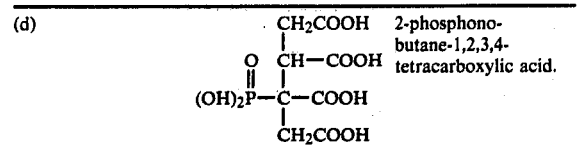 2-phosphonobutane-1,2,3,4-tetracarboxylic acid.

STRUCTURE III (e) 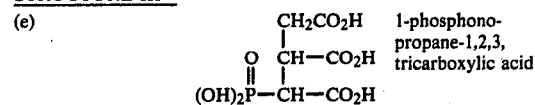 1-phosphonopropane-1,2,3, tricarboxylic acid

CONCLUSION

The foregoing results indicate that the phosphonocarboxylic compounds of structures II and III are significantly and unexpectedly superior to those of Structure I in preventing corrosion in the instant aqueous systems.

EXAMPLE 4

Reduction of Corrosion Rate and Scaling Rate by use of hydrolyzed polymaleic anhydride In order to demonstrate this activity, a series of tests were conducted in a rig which utilises a recirculating water open evaporative cooling circuit in which the water is maintained at a fixed concentration factor by adjusting the blowdown and make-up rates. Water is pumped from the cooling tower sump through an admiralty brass heat exchanger, flow meter and coupon chamber to the cooling tower. The coupon chamber contains mild steel and copper coupons held on an insulating holder. The water, at 40° C., cascades down the cooling tower to the cooling tower sump, from which it is recirculated again at 35° C. For each test run the water is concentrated to the required concentration factor, and treated with a passivation dose of the inhibitor under test. The pre-weighed metal coupons are inserted and the inhibitor level is then allowed to fall over three days to the recommended treatment level. This concentration is then maintained by dosing the feedwater with the required amount of inhibitor during the entire period of the test run. Treatment levels using in this test are typical of those found in industrial systems, and, where comparisons are made, the dose rates are always identical. The test is run for a further fourteen days after which time the coupons and the heat exchanger are removed. The corrosion rates are determined by measuring the weight loss of the coupons and the rate of scale is determined from the gain in weight of the heat exchanger.

Tests were conducted in two different waters; water A is a natural water concentrated three times; water B is the same water treated with acid to reduce the pH. The analyses are given below:

| | Phenol alkalinity ppm as CaCO$_3$ | Total alkalinity | Total hardness | pH | Ryznar index |
|---|---|---|---|---|---|
| water A | 50 | 185 | 390 | 8.7 | 4.5 |
| water B | 0 | 110 | 400 | 7.5 | 6.5 | two formulations were tested in these waters, one containing hydrolysed polymaleic anhydride and the other without. The formulations tested were:

| Formulation 1: | 7% 2-phosphonobutane-1,2,4-tricarboxylic acid |
| | 20% sodium polyphosphate as $P_2O_5$ |
| | 0.5% benzotriazole |
| Formulation 2: | 7% 2-phosphonobutane-1,2,4-tricarboxylic acid |
| | 20% sodium polyphosphate as $P_2O_5$ |
| | 0.5% benzotriazole |
| | 2% hydrolyzed polymaleic anhydride |

| Formulation | Water type | Scaling rate (g/day) | Corrosion rate (mdd) mild steel | Copper |
|---|---|---|---|---|
| Blank | A | 2.35 | 76.5 | 3.5 |
| 1 | A | 0.45 | 20.6 | 0.6 |
| 2 | A | 0.03 | 12.4 | 0.5 |
| Blank | B | 0.41 | 218.7 | 15.6 |
| 1 | B | 0.16 | 30.3 | 2.5 |
| 2 | B | 0.08 | 23.0 | 2.0 |

These results show that in the natural water A, formulation 1, although effective in controlling corrosion of mild steel and copper still gives rise to a significant rate of scale formation. The use of Formulation 2 (containing hydrolyzed polymaleic anhydride) in water A eliminates the problems of scale formation and in fact reduces still further the corrosion rate of mild steel.

The use of the acid dosed water B increases the corrosion rate of mild steel and, although the use of formulation 1 in this water reduces the corrosion rates of both mild steel and copper, they are still higher than in water A. The scaling rates in water B are noticeably lower than in water A, as is expected. However, the use of formulation 2 in water B reduces still further the scaling rate and also gives rise to some improvement in the corrosion rate.

These results clearly demonstrate the improvement imparted to polyphosphate-based corrosion inhibitors by the incorporation of hydrolysed polymaleic anhydride.

What is claimed is:

1. A method of inhibiting the deposition of calcium phosphate scale or sludge from an aqueous system, treated with a corrosion inhibitor formulation, which method comprises
treating the aqueous system with 1 to 100 ppm, based on the aqueous system, of a formulation which consists essentially of
(a) 40 to 69.5% by weight of the total formulation of a phosphono-carboxylic acid selected from the group consisting of a compound of formula II

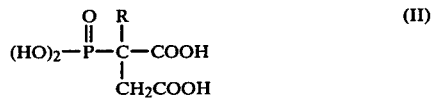

wherein R is hydrogen, an alkyl, an alkenyl or alkynyl group, each having up to 4 carbon atoms, a phenyl group, cycloalkyl group having from 3 to 6 carbon atoms, a benzyl group, a phenethyl group or a residue having the formula:

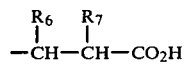

wherein $R_6$ is hydrogen, an alkyl group having from 1 to 4 carbon atoms or a carboxyl group and $R_7$ is hydrogen or methyl group; a compound having formula III

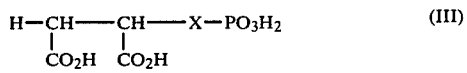

wherein X is

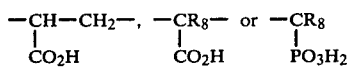

wherein $R_8$ is hydrogen or methyl; and a mixture of compounds selected from the group consisting of those of formula II and formula III;

(b) 30 to 50% by weight of the total formulation of a polyphosphate selected from the group consisting of tetrasodium pyrophosphate, sodium tripolyphosphate or a polymeric sodium metaphosphate of formula:

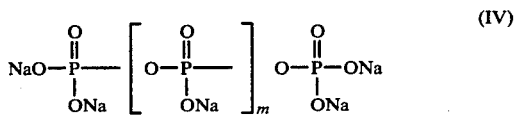

wherein m is an integer from 4 to 20; and (c) 0.5 to 10% by weight of the total formulation of hydrolyzed polymaleic anhydride having a molecular weight in the range of from 300 to 500, as determined by calculation following osmometric measurement on polymaleic anhydride before hydrolyzing, or a water soluble salt of such a hydrolyzed polymaleic anhydride.

2. A method according to claim 1 wherein the phosphono-carboxylic acid is selected from the group consisting of 1-phosphonoethane-1,2-dicarboxylic acid, 2-phosphonobutane-1,2,4-tricarboxylic acid, 2-phosphonobutane-1,2,3,4-tetracarboxylic acid and 1-phosphonopropane-1,2,3-tricarboxylic acid.

3. A method according to claim 2 wherein the phosphono-carboxylic acid is 2-phosphonobutane-1,2,4-tricarboxylic acid.

4. A method according to claim 1 wherein the total amount used is within the range of from 10 to 40 ppm calculated on the aqueous system.

* * * * *